US012692978B2

(12) United States Patent
Strashny et al.

(10) Patent No.: US 12,692,978 B2
(45) Date of Patent: Jul. 28, 2026

(54) FLUID DISTRIBUTION ASSEMBLY

(71) Applicant: Caterpillar Global Mining LLC, Tucson, AZ (US)

(72) Inventors: Igor Strashny, Tucson, AZ (US); Candace Bauer, Tucson, AZ (US)

(73) Assignee: Caterpillar Global Mining LLC, Tucson, AZ (US)

( * ) Notice: Subject to any disclaimer, the term of this patent is extended or adjusted under 35 U.S.C. 154(b) by 0 days.

(21) Appl. No.: 17/638,692

(22) PCT Filed: Aug. 17, 2020

(86) PCT No.: PCT/US2020/046616

§ 371 (c)(1),
(2) Date: Sep. 29, 2022

(87) PCT Pub. No.: WO2021/041071

PCT Pub. Date: Mar. 4, 2021

(65) Prior Publication Data

US 2024/0200720 A1     Jun. 20, 2024

(30) Foreign Application Priority Data

Aug. 27, 2019     (GB) ..................................... 1912276

(51) Int. Cl.
F16N 25/00          (2006.01)
E02F 9/00           (2006.01)

(52) U.S. Cl.
CPC .............. F16N 25/00 (2013.01); E02F 9/006 (2013.01)

(58) Field of Classification Search
CPC ........ F16N 25/00; F16C 11/04; F16C 11/045; E02F 9/00
USPC ......................................................... 384/473
See application file for complete search history.

(56) References Cited

U.S. PATENT DOCUMENTS

| | | | |
|---|---|---|---|
| 1,468,802 A | 9/1923 | Coleman | |
| 3,997,274 A * | 12/1976 | Iverson ................... | E02F 9/006 403/14 |
| 4,270,286 A * | 6/1981 | Mieger ..................... | E02F 3/96 251/339 |

(Continued)

FOREIGN PATENT DOCUMENTS

| | | |
|---|---|---|
| EP | 3184699 A1 | 6/2017 |
| GB | 2539766 A | 12/2016 |
| WO | 2006009175 A1 | 1/2006 |

OTHER PUBLICATIONS

International Search Report related to Application No. PCT/US2020/046616; reported on Feb. 17, 2021.

(Continued)

*Primary Examiner* — Robert W Hodge
*Assistant Examiner* — Mark K Buse

(57)          ABSTRACT

The present disclosure is directed towards a fluid distribution assembly. The fluid distribution assembly comprises a distribution device comprising at least one device inlet for receiving fluid and at least one device outlet for directing fluid out of the distribution device. The fluid distribution assembly comprises at least one distribution plate adjacent to the distribution device comprising at least one distribution arrangement for controlling the communication of fluid to and/or from the at least one device inlet and/or outlet.

13 Claims, 13 Drawing Sheets

(56) References Cited

U.S. PATENT DOCUMENTS

| | | | |
|---|---|---|---|
| 4,312,425 A * | 1/1982 | Snow | F16N 25/02 |
| | | | 184/7.4 |
| 5,480,004 A * | 1/1996 | Snow | F16N 25/02 |
| | | | 184/7.4 |
| 5,896,834 A | 4/1999 | Gruner | |
| 5,964,283 A | 10/1999 | Pavlin | |
| 6,322,280 B1 * | 11/2001 | Coyne | F16C 11/045 |
| | | | 403/370 |
| 7,651,274 B2 | 1/2010 | Yamamoto et al. | |
| 8,459,894 B2 * | 6/2013 | Svensson | F16C 11/045 |
| | | | 403/370 |
| 8,887,688 B1 | 11/2014 | Neal et al. | |
| 8,944,717 B2 * | 2/2015 | Ditzler | F01M 11/00 |
| | | | 403/38 |
| 10,222,138 B2 | 3/2019 | Ollier | |
| 2002/0081046 A1 * | 6/2002 | Hamaguchi | F16C 11/045 |
| | | | 384/276 |
| 2005/0013518 A1 * | 1/2005 | Schaffer | F16C 11/045 |
| | | | 384/130 |
| 2007/0029140 A1 | 2/2007 | Smigelski | |
| 2008/0089627 A1 * | 4/2008 | Yamamoto | F16C 23/045 |
| | | | 384/473 |
| 2014/0153997 A1 * | 6/2014 | Ditzler | E02F 9/2275 |
| | | | 403/38 |
| 2015/0047928 A1 * | 2/2015 | Hiner | F15B 20/00 |
| | | | 137/488 |
| 2016/0084297 A1 * | 3/2016 | Tormen | F16C 11/045 |
| | | | 403/42 |

OTHER PUBLICATIONS

Great Britain Search Report related to Application No. 1912276.1; reported on Feb. 21, 2020.

Examination Report for European Patent Appln. No. 20764517.7, mailed Apr. 14, 2025 (3 pgs).

* cited by examiner

FLUID DISTRIBUTION ASSEMBLY

CROSS-REFERENCE TO RELATED APPLICATION

This Application is a 35 USC § 371 US National Stage filing of International Application No. PCT/US2020/046616 filed on Aug. 17, 2020 which claims priority under the Paris Convention to Great Britain Patent Application No. No. 1912276.1 filed on Aug. 27, 2019.

TECHNICAL FIELD

This disclosure is directed towards a fluid distribution assembly. The present disclosure is further directed to a kit comprising a plurality of distribution devices and a plurality of distribution plates for a plurality of fluid distribution assemblies, a coupling assembly comprising a fluid distribution assembly, a machine comprising a coupling assembly and a method of distributing fluid to a coupling assembly of a machine.

BACKGROUND

Machines, including backhoe loaders, excavators, loaders and the like, commonly comprise one or more work tools, such as buckets, backhoes, arms, grapples and the like, attached to the machine by an arm arrangement, for example comprising a stick and a boom. Coupling assemblies may be provided to connect components together such that they can rotate relative to one another. For example, a stick may be rotatably mounted to a boom by a coupling assembly. Typically, the coupling assembly may comprise a pin rotatably mounted in one or more bearing housings and the components are mounted to the pin and one or more bearing housings.

Lubricant is commonly provided to the pin and one or more bearing housings in order to reduce the friction therebetween, thereby improving the performance and lifetime of the coupling assembly. The machine therefore may comprise a lubricant delivery system for delivering lubricant to one or more coupling assemblies of the machine. A lubricant delivery system may include a reservoir for storing lubricant, a pump for driving lubricant through the lubricant delivery system, distributor blocks for distributing quantities of lubricant to multiple outlets and lines or flexible hoses for fluidly connecting the reservoir, pump and the distributor blocks with the coupling assemblies. However, such lines or flexible hoses are exposed to falling debris and rocks in the working environment around the machine. Furthermore, the lubricant delivery system may be very complex, thereby increasing maintenance requirements, due to the high number of coupling assemblies requiring lubrication in such machines.

U.S. Pat. No. 7,651,274B2 discloses a spherical slide bearing having an outer ring and an inner ring slidably retained within the outer ring. A pin having a lubricant supply flow path extending through an interior thereof to open in an outer peripheral surface thereof is inserted into the inner ring so that the pin is circumferentially slidable, with the inner ring being equipped with a communication flow path establishing communication between a gap defined between the inner ring and the pin and a gap defined between the inner ring and the outer ring. The inlet port of the communication flow path is provided at a position where lubricant having flown out of an outlet port of the lubricant supply flow path flows after having flown through the gap between the pin and the inner ring substantially through the entire length in the axial direction of the pin. However, such a system still requires multiple lines or hoses for delivering lubricant and the system has to be individually designed for each specific machine.

SUMMARY

The present disclosure therefore provides a fluid distribution assembly comprising: a distribution device comprising at least one device inlet for receiving fluid and at least one device outlet for directing fluid out of the distribution device; and at least one distribution plate adjacent to the distribution device comprising at least one distribution arrangement for controlling the communication of fluid to and/or from the at least one device inlet and/or outlet.

The present disclosure further provides a kit comprising a plurality of distribution devices and a plurality of distribution plates for a plurality of fluid distribution assemblies according to the present disclosure, wherein the distribution devices are identical and at least two distribution plates comprise different distribution arrangements.

The present disclosure further provides a coupling assembly for a machine comprising: a pin comprising at least a first pin passageway for fluid extending between a first pin passageway inlet and a first pin passageway outlet for directing fluid outside of the pin; and a fluid distribution assembly of the present disclosure mounted to the pin such that the first pin passageway inlet or outlet is configured to communicate fluid with the at least one device outlet or inlet respectively via the at least one distribution arrangement.

The present disclosure further provides a machine comprising at least one coupling assembly of the present disclosure, at least one first component and at least one second component rotatable relative to one another about the pin and a fluid delivery system for delivering and/or receiving fluid from the at least one coupling assembly.

The present disclosure further provides a method for distributing fluid to the coupling assembly of the present disclosure comprising: receiving fluid through the at least one device inlet; directing the fluid through the at least one device outlet, through the at least one distribution arrangement and to the first pin passageway inlet, along the first pin passageway and to the first pin passageway outlet; and directing fluid outside of the pin via the first pin passageway outlet.

BRIEF DESCRIPTION OF THE DRAWINGS

By way of example only, embodiments of apparatuses and methods of the present disclosure are now described with reference to, and as shown in, the accompanying drawings, in which.

DETAILED DESCRIPTION

The present disclosure is generally directed towards a fluid distribution assembly. The fluid distribution assembly may be for a machine and may be for a coupling assembly of a machine. The fluid may be a lubricant and the fluid distribution assembly may thus be a lubricant distribution assembly. The fluid distribution assembly may be for a rotatable coupling or joint assembly of a work machine which may reduce the number of fluid hoses required for lubricant or other such fluid. The fluid distribution assembly is configured such that it may be easily adapted for different coupling assemblies. The coupling assembly comprises a pin and the fluid distribution assembly and may comprise a bearing housing. The pin comprises a number of internal pin passageways for directing fluid therein. The fluid distribution assembly splits an input flow of fluid into one or more predetermined quantities of fluid and direct these predetermined quantities through one or more outlets. The bearing housing may house the pin and may communicate the fluid between a fluid delivery system and one or more of the internal pin passageways. The fluid enters a pin passageway and is directed to the fluid distribution assembly, where it is split into one or more predetermined quantities and fed into one or more outlets of the fluid distribution assembly. The fluid then enters one or more pin passageways. One or more of the pin passageways may direct fluid to the interface between the pin and the bearing housing. One or more of pin passageways may also direct fluid back through the bearing housing and into the fluid delivery system. This outgoing stream of fluid may then supply another coupling assembly.

Figure 1:
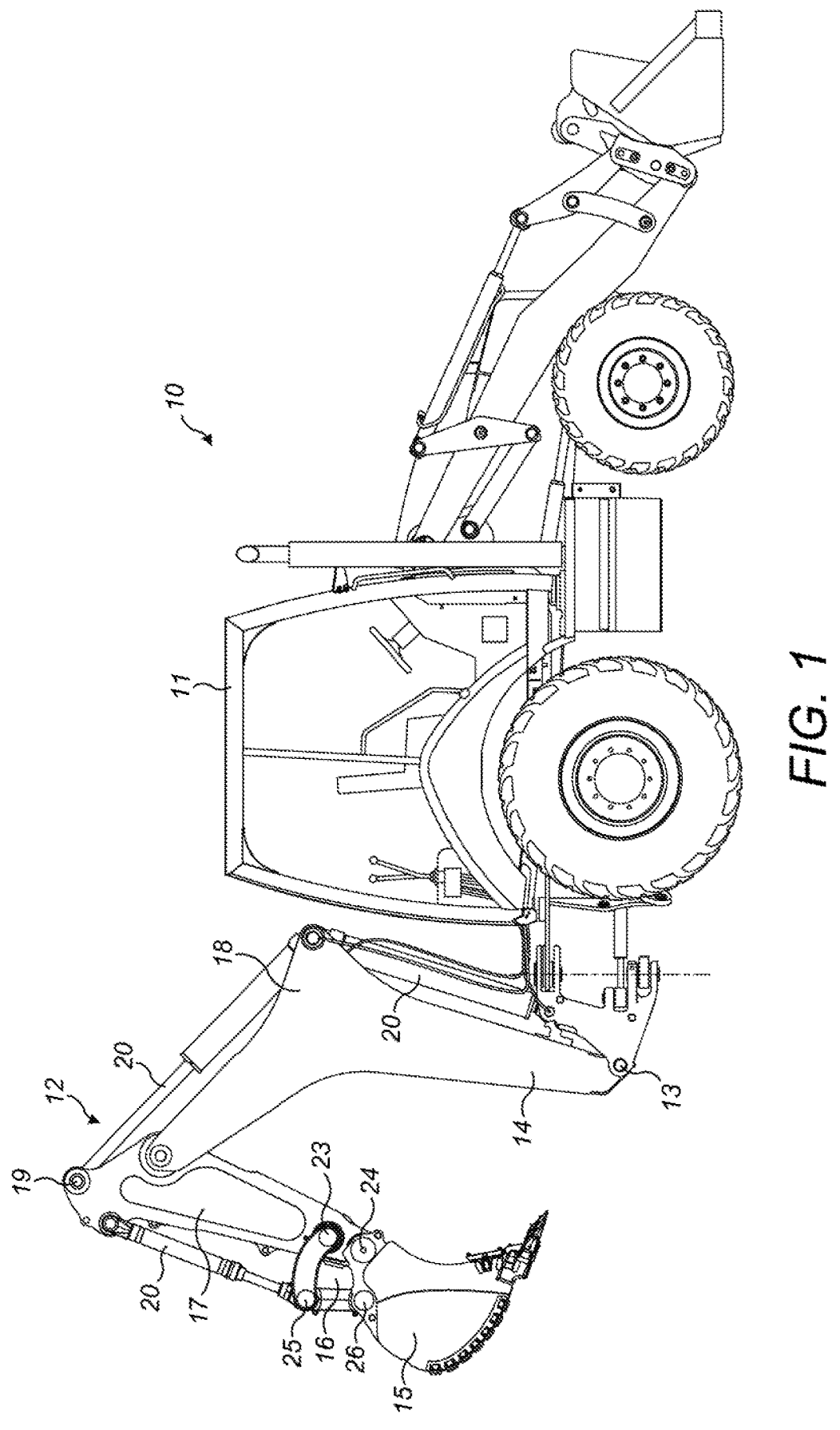
FIG. 1 is a side elevation of a machine comprising a plurality of coupling assemblies comprising a fluid distribution assembly of the present disclosure.

FIG. 1 illustrates a machine 10 comprising at least one coupling assembly 13, 19, 23, 24, 25, 26. The at least one coupling assembly 13, 19, 23, 24, 25, 26 may pivotally or rotatably connect at least two components of the machine 10 to one another. In the illustrated embodiment the machine 10 comprises a backhoe loader, although the machine 10 may be any other type comprising at least one coupling assembly 13, 19, 23, 24, 25, 26, such as a work machine, truck (e.g. a dump truck), excavator, another type of loader such as a wheel loader or track loader, dozer, shovel, material handler or telehandler.

The machine 10 may comprise a main body 11 and a work tool 12 pivotally attached to the main body 11 about a work tool coupling assembly 13. The work tool 12 may comprise an arm arrangement 14 pivotally mounted about the work tool coupling assembly 13 to the main body 11. The arm arrangement 14 may comprise a boom 18 rotatably attached to the stick 17 at a boom stick coupling assembly 19. The work tool 12 may comprise an implement 15 rotatably attached to the arm arrangement 14 by at least one implement coupling arrangement 16. The implement coupling arrangement 16 may facilitate pivoting of the implement 15 with respect to a stick 17 and is illustrated in further detail in FIG. 2. The implement coupling arrangement 16 may comprise a plurality of coupling assemblies 23, 24, 25, 26. The machine 10 may comprise at least one actuator 20 for controlling the work tool 12 by, for example, pivoting or rotating one or more of the components of the work tool 12 (e.g. the boom 18, stick 17 and implement 15) about the work tool coupling assembly 13, implement coupling arrangement 16 and boom stick coupling assembly 19 and thereby enabling the performance of work using the implement 15.

Figure 2:
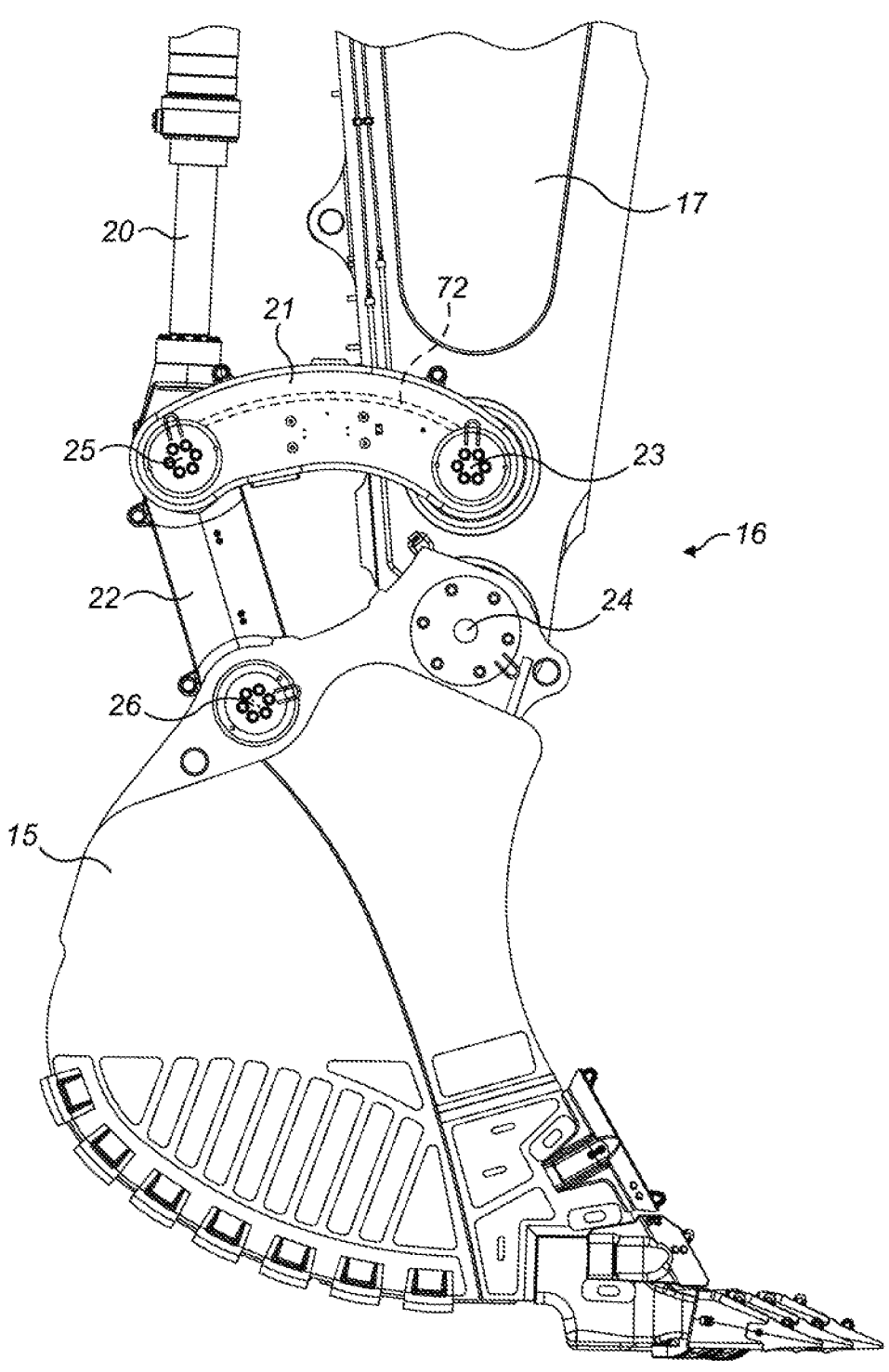
FIG. 2 is a side elevation of a work tool of the machine of FIG. 1.
Figure 3:
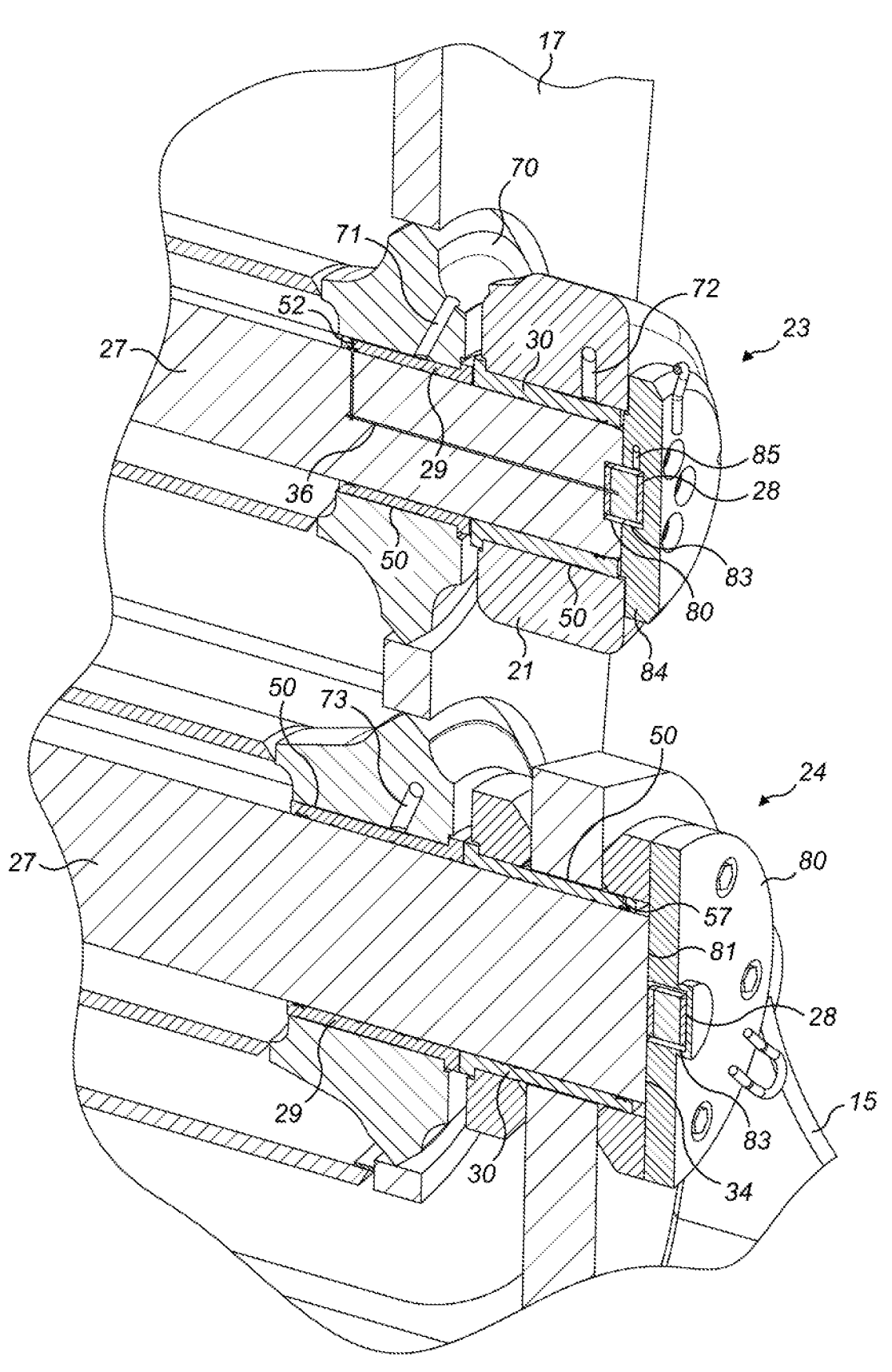
FIG. 3 is a perspective view of a cross section of an implement coupling arrangement of the work tool of FIG. 2.

The machine 10 may comprise a fluid delivery system 75 for delivering fluid to the at least one coupling assembly 13, 19, 23, 24, 25, 26. The fluid delivery system 75 may comprise at least one reservoir of fluid (not illustrated in the drawings) and at least one pump (not illustrated in the drawings) for directing fluid through the fluid delivery system 75. The fluid delivery system 75 may comprise at least one fluid system passageway 71 and/or flexible hose (not illustrated in the drawings) for directing fluid from the reservoir, through the at least one pump and to the at least one coupling assembly 13, 19, 23, 24, 25, 26. At least one fluid system passageway 71 may be integrated inside the one or more components of the coupling arrangement (for example at least one of the stick 17, boom 18, implement 15, at least one first coupling arm 21 and/or at least one second coupling arm 22) and direct fluid to the at least one coupling assembly 13, 19, 23, 24, 25, 26 of the present disclosure. In particular, as illustrated in FIG. 3, a first component 70 (in this case a component of the stick 17) may comprise a first fluid system passageway 71 (e.g. bore) for directing fluid to at least one coupling assembly 23. Although not shown, a hose or other fluid system passageway may be mounted to the first fluid system passageway 71 to deliver fluid thereto. A second component 21 (in this case a first coupling arm 21) may comprise a second fluid system passageway 72 that may extend between two coupling assemblies 23, 25, as illustrated in FIG. 2. Further fluid passageways 73 may be located in other components and in fluid communication with other coupling assemblies 24, 26.

The coupling assembly 13, 19, 23, 24, 25, 26 of the present disclosure will be described with particular reference to its application in the implement coupling arrangement 16, but may be applied in any coupling assembly 13, 19, 23, 24, 25, 26 of the machine 10, such as the work tool coupling assembly 13 and boom stick coupling assembly 19. FIG. 2 illustrates the implement coupling arrangement 16 in further detail. The implement coupling arrangement 16 may comprise at least one first coupling arm 21 pivotally attached by a first coupling assembly 23 to the stick 17. The implement coupling arrangement 16 may comprise a second coupling assembly 24 pivotally connecting the stick 17 and the implement 15. The at least one first coupling arm 21 may be attached to at least one second coupling arm 22 by a third coupling assembly 25. The at least one second coupling arm 22 may be attached by a fourth coupling assembly 26 to the implement 15.

Figure 4:
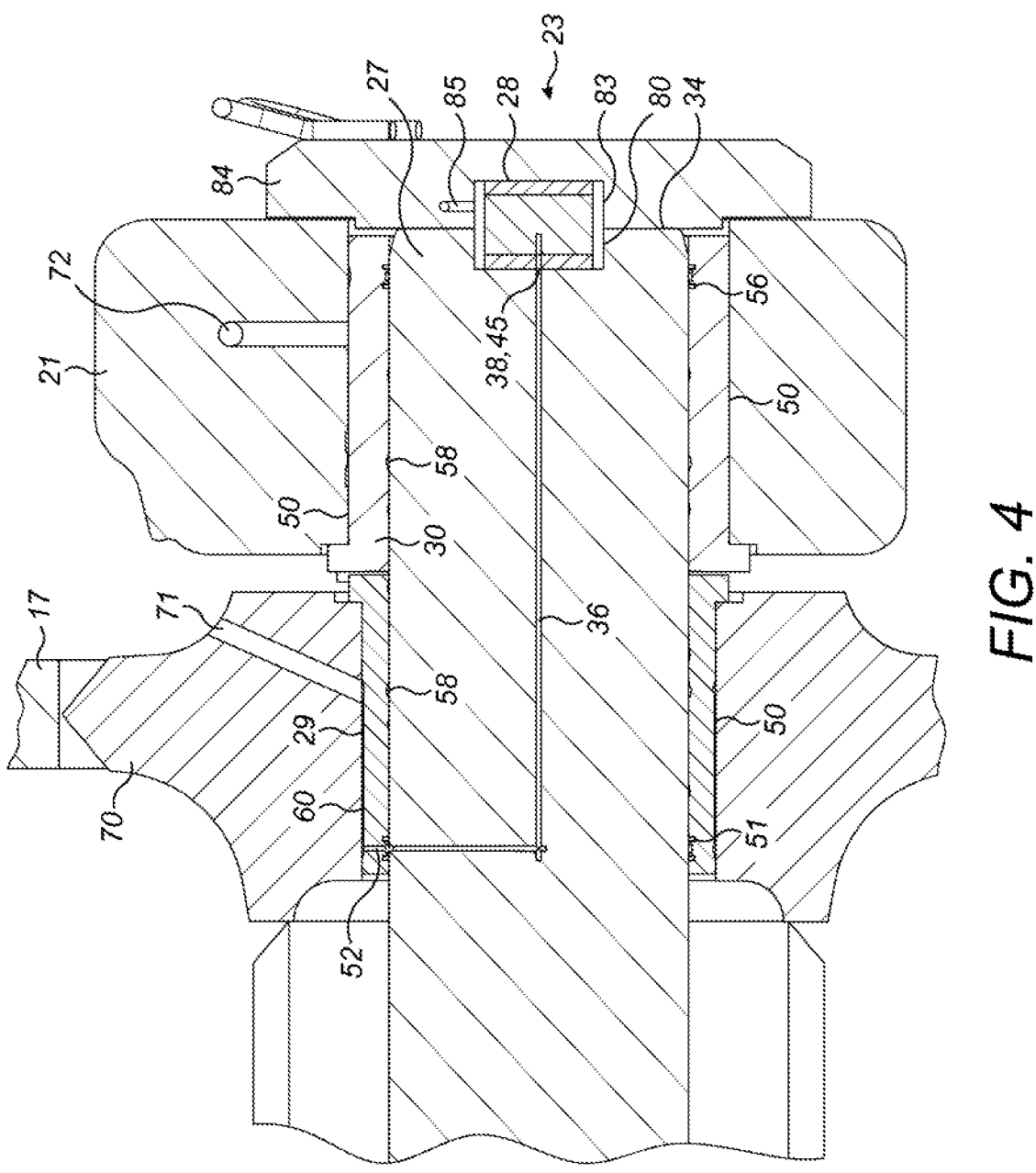
FIG. 4 is a side elevation of a cross section of a first coupling arrangement of the implement coupling arrangement of FIG. 2.

FIG. 3 illustrates the first and second coupling assemblies 23, 24 and FIG. 4 illustrates the first coupling assembly 23 in further detail. The following references to "the coupling assembly" applies to both the first and second coupling assemblies 23, 24 and the same reference numerals have been used to indicate the same features in the first and second coupling assemblies 23, 24 unless otherwise stated. The coupling assembly 23, 24 comprises a pin 27 and a fluid distribution assembly 28 mounted to the pin 27. The coupling assembly 23, 24 may comprise one or more bearing housings 29, 30.

The pin 27 may be rotatably mounted in the one or more bearing housings 29, 30 and at least two components of the machine 10 (for example in the case of the first coupling assembly 23 the at least two components are the stick 17 and the first coupling arm 21) may be mounted to the one or more bearing housings 29, 30 such that the at least two components can pivot relative to one another by the relative movement between the pin 27 and the one or more bearing housings 29, 30. In particular, each component may comprise a component passageway 50 and one or more bearing housings 29, 30 may be mounted in the component passageway 50 such that the one or more bearing housings 29, 30 does not rotate relative to the component to which it is mounted. A first bearing housing 29 may be mounted in a passageway of the stick 17 and a second bearing housing 30 may be mounted in a passageway of the first coupling arm 21. The pin 27 extends between the bearing housings 29, 30 of the stick 17 and first coupling arm 21 and they are therefore operable to pivot relative to one another about the pin 27.

Figure 5:
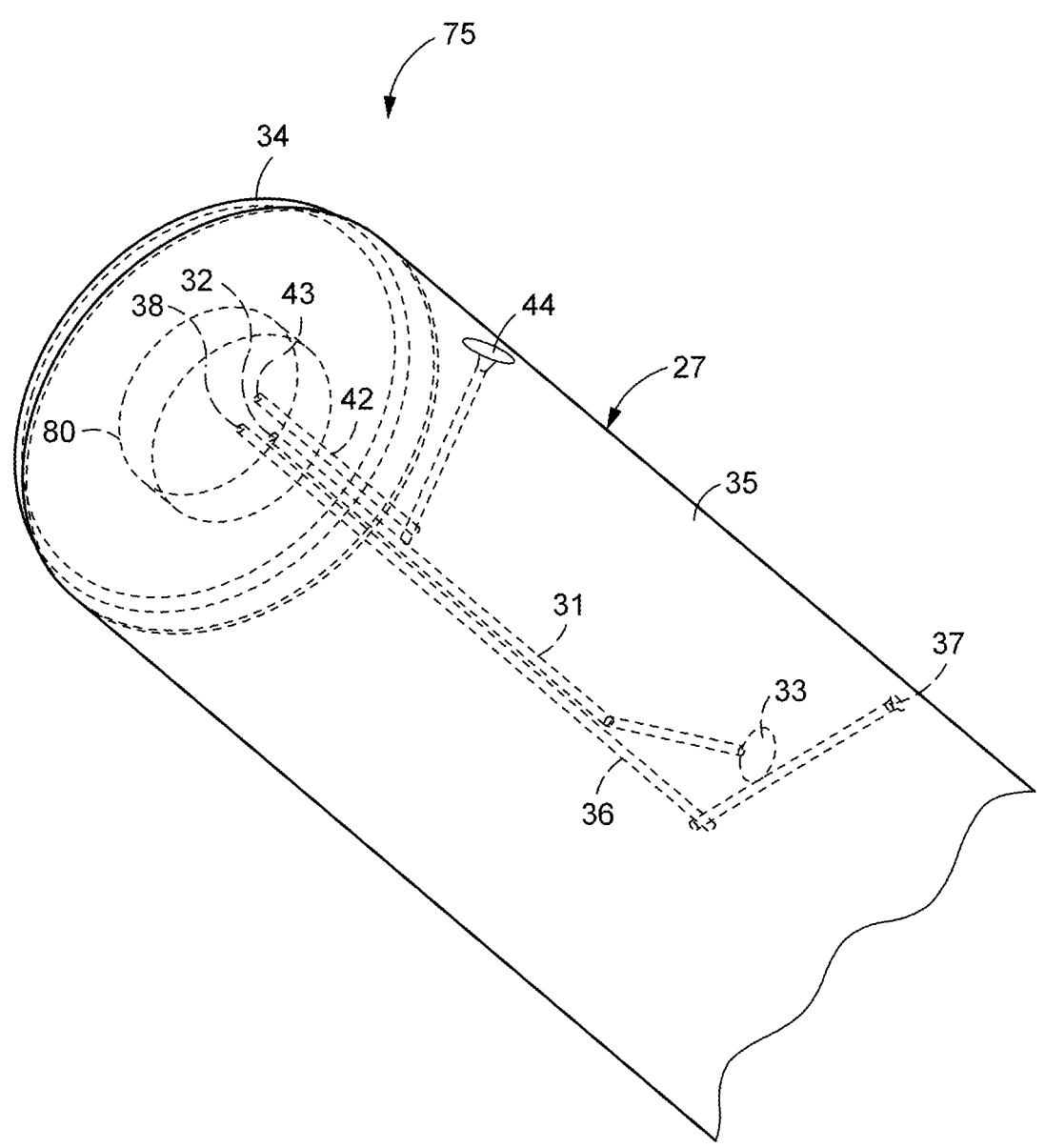
FIG. 5 is a transparent perspective view of a pin of the implement coupling arrangement of FIG. 2 showing pin passageways within the pin.

In the present disclosure the fluid delivery system 75 directs fluid to the fluid distribution assembly 28, through at least one passageway 33, 36, 42 in the pin 27 and to the interface between the one or more bearing housings 29 and pin 27 to provide lubrication of the first coupling assembly 23. As illustrated in detail in FIG. 5, the pin 27 comprises a first pin passageway 31 extending between a first pin passageway inlet 32 and a first pin passageway outlet 33. The pin 27 may comprise a second and/or third pin passageway 36, 42 extending respectively between a second and/or third pin passageway inlet 37, 43 and a second and/or third pin passageway outlet 38, 44. The pin 27 may comprise additional pin passageways. The terms "first", "second" and "third" are used herein for nomenclature purposes only rather than defining a quantity and are thus interchangeable.

The pin 27 may comprise a first end 34, a second end (not shown in the illustrations) and an outer surface 35, which may extend between the first and second ends 34 and may be cylindrical. The pin passageway inlets 32, 37, 43 and outlets 33, 38, 44 may be located at the first end 34, second end and/or outer surface 35. The first pin passageway inlet 32 may be located at the first end 34 and the first pin passageway outlet 33 may be located at the outer surface 35. The second pin passageway inlet 37 may be located at the outer surface 35 and the second pin passageway outlet 38 may be located at the first end 34. The third pin passageway inlet 43 may be located at the first end 34 and the third pin passageway outlet 44 may be located at the outer surface 35. The first and third pin passageways 31, 42 may be configured to direct fluid from the fluid distribution assembly 28 to between the pin 27 and the one or more bearing housings 29, 30. The second pin passageway 36 may be configured to receive fluid and direct the fluid to the fluid distribution assembly 28.

The one or more bearing housings 29, 30 may comprise a first internal seal 51 and may comprise at least one housing input passageway 52 arranged to direct fluid to the first internal seal 51. The pin 27 may be mounted in the one or more bearing housings 29 such that the second pin passageway inlet 37 is aligned with and arranged to receive fluid from the at least one housing input passageway 52 via the first internal seal 51. The first internal seal 51 may prevent fluid from leaking along the outer surface 35 of the pin 27 and may instead direct fluid from the at least one housing input passageway 52 to the second pin passageway inlet 37. The one or more bearing housings 29, 30 may comprise at least one second internal seal 56 formed in a substantially similar manner. As shown in the Figures the first internal seal 51 may be formed on the first bearing housing 29 and the second internal seal 56 may be formed on the second bearing housing 30. The second internal seal 56 may be identical in design and/or function to the first internal seal 51.

The pin 27 may be a floating pin 27 and may be able to move transversely (i.e. along the axis of rotation of the pin 27) in addition to rotating in the one or more bearing housings 29, 30. The distance the pin 27 may move transversely may depend upon the size of the coupling assembly 23, 24 and, for example, may be able to move transversely 2 to 4 mm in use. The internal seals 51, 56 of the one or more bearing housings 29, 30 may be especially able to facilitate a floating pin 27 in the present disclosure. The elastomeric seals 53, 54 may be able to maintain the internal seal cavity 55 for fluid between the one or more bearing housings 29, 30 and the outer surface 35 of the pin 27 allowing the floating pin 27 to move transversely in use.

The one or more bearing housings 29, 30 may comprise at least one internal groove 58, which may be located on an inner surface of the one or more bearing housings 29, 30 that engages the pin 27. The at least one internal groove 58 may be arranged to distribute fluid received from the first and/or third pin passageway outlets 33, 44 to the interface between the pin 27 and the one or more bearing housings 29 in which the pin 27 is located. In particular, the at least one internal groove 58 may be aligned with the first and/or third pin passageway outlet 33, 44. The at least one internal groove 58 may be radial, helical, a mixture of radial and helical and/or any other suitable shape for distributing fluid. The one or more bearing housings 29, 30 may comprise at least one external groove 60, which may be located on an outer surface of the one or more bearing housings 29, 30 that engages the component passageway 50 in which the one or more bearing housings 29, 30 is located. The at least one external groove 60 may be configured to communicate fluid between the one or more component passageways 50 of the fluid delivery system 75 and the at least one housing input passageway 52.

The fluid distribution assembly 28 may be mounted to the pin 27 at least partially in a pin recess 80 in the first end 34 of the pin 27 and at least partially in a mounting component recess 83 of a mounting component 84 to which the fluid distribution assembly 28 is mounted, as illustrated in FIGS. 3 and 4 in the first coupling assembly 23. The fluid distribution assembly 28 may thus be mounted to the pin 27 such that it is partially encapsulated by each of the pin recess 80 and mounting component recess 83. Thus in the first coupling assembly 23 the first and third pin passageway inlets 32, 43 and the second pin passageway outlet 38 may extend to and be located in the pin recess 80. Alternatively, the fluid distribution assembly 28 may be mounted to a substantially flat surface 81 at the first end 34 of the pin 27 and at least partially in the mounting component recess 83 of the mounting component 84 as illustrated in FIG. 3 in the second coupling assembly 24. The fluid distribution assembly 28 may therefore be mounted completely outside the pin 27. Thus in the second coupling assembly 24 the first and third pin passageway inlets 32, 43 and the second pin passageway outlet 38 extend to and are located at the flat surface 81.

The fluid distribution assembly 28 is for distributing fluid around the coupling assembly 23, 24 and is illustrated in further detail in FIGS. 6 to 10. The fluid distribution assembly 28 comprises a distribution device 100 and at least one distribution plate 101, 102. The distribution device 100 and at least one distribution plate 101, 102 may be fixed and/or mounted to one another and may be fixed and/or mounted to the pin 27 such that the pin 27, distribution device 100 and at least one distribution plate 101, 102 rotate together and do not rotate relative to one another.

The distribution device 100 comprises at least one device inlet 104 for receiving fluid from the fluid delivery system 75 (e.g. from a hose or pin passageway 33, 36, 42) and at least one device outlet 105 for directing fluid out of the distribution device 100 (e.g. to a pin passageway 33, 36, 42). The distribution device 100 may comprise first and second device ends 106, 107, which may be circular as illustrated, at which the at least one device inlet 104 and/or outlet 105 may be located. A plurality of device outlets 105, optionally all of the device outlets 105, may be located at the first device end 106 and may be arranged in an array. In particular, the array of device outlets 105 may be separated from one another in the shape of a square as illustrated. At least one device inlet 104 may be located within the array and may be located at the centre of the first device end 106. At least one device inlet 104 may be located off-centre at the first device end 106 and may be located adjacent to the periphery of the first device end 106. At least one device inlet 104 may be located at the centre of the second device end 107. At least one device inlet 104 may be located off-centre at the second device end 107 and may be located adjacent to the periphery of the second device end 107.

The distribution device 100 may comprise a device side 108, which may be substantially cylindrical as illustrated, extending between the first and second device ends 106, 107. The distribution device 100 may comprise first and second device side seals 109, 110, which may be elastomeric and may be located at first and second flanges 111, 112 at either end of the device side 108. A device side recess 113 may extend around the circumference of the device side 108 between the first and second flanges 111, 112. The device side 108 may comprise at least one device side outlet 114 therein for communicating fluid outside of the distribution device 100 (the outlet 114 may also be an inlet for receiving fluid from outside of the distribution device 100). The distribution device 100 may be mounted in the pin recess 80 and/or mounting component recess 83 and the first and second device side seals 109, 110 may seal it thereto. In particular, fluid flowing from the at least one device side outlet 114 may be sealed within the device side recess 113. The mounting component 84, and/or pin 27 may comprise a side passageway 85, illustrated in the mounting component 84 of the first coupling assembly 23, leading from the device side recess 113. The side passageway 85 may be in communication with, and thereby direct fluid from the at least one device side outlet 114 to, another coupling assembly 13, 19, 24, 25, 26 (not illustrated).

The distribution device 100 may be arranged to receive fluid from the at least one device inlet 104 and selectively distribute predetermined quantities of the received fluid through the at least one device outlet 105. The distribution device 100 may operate in accordance with any known distribution block method and may comprise at least one spool configured to control the distribution of fluid from the at least one device inlet 104 to the at least one device outlet 105. Each spool may be configured to control flow through at least two device outlets 105. The distribution device 100 may comprise four spools and eight device outlets 105 as illustrated. The at least one spool may be configured to distribute a predetermined flowrate of fluid, which may be in discrete volumes, to the at least one device outlet 105. The at least one spool may be configured to distribute substantially the same predetermined flowrate of fluid to each of a plurality of device outlets 105. The distribution device 100 may comprise at least one spool passageway and at least one check valve per device outlet 105. The distribution device 100 may operate as a single-line series progressive distributor. As is known in the art (and not illustrated in the Figures), the distribution device 100 may comprise at least one spool operable to move between first and second positions by backpressure caused by fluid entering the at least one device inlet 104. The at least one spool in the first position may block the communication of fluid from the distribution device 100 to the at least one device outlet 105 and in the second position may facilitate the communication of fluid from the distribution device 100 to the at least one device outlet 105. The distribution device 100 may contain a plurality of spools, which may, when in a second position, facilitate the communication of fluid from the distribution device 100 to a respective device outlet 105. The distribution device 100 may be arranged to sequentially move each spool, therefore sequentially outputting the respective predetermined quantity of fluid out of the respective device outlet 105. The internal geometry of the distribution device 100 and the spools may determine the predetermined quantities of fluid distributed. The distribution device 100 may be arranged to follow a periodic/cyclic process, such that the pattern of the movement of the spools restarts once finished. The distribution device 100 may not require electrical control or input, and may work only by the input of fluid, the internal geometry and the spools. The check valves may prevent fluid from re-entering the at least one spool passageway from the at least one device outlet 105.

Figure 9:
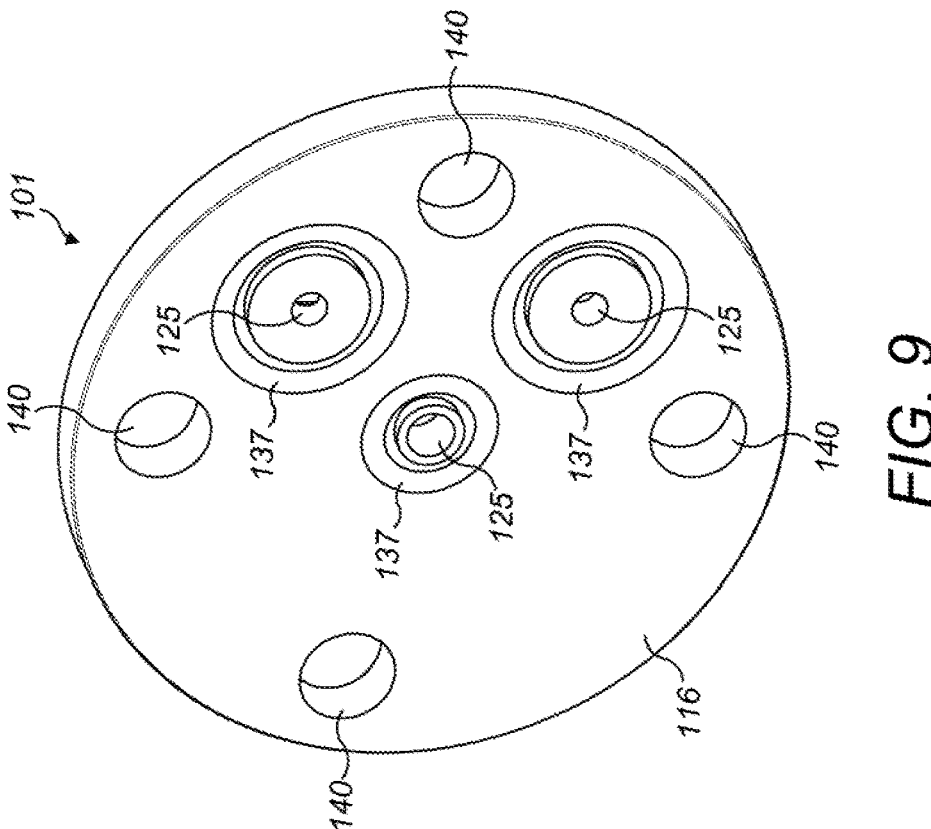
FIG. 9 is a perspective view of an outer face of a first distribution plate of the fluid distribution assembly of FIG. 6.
Figure 8:
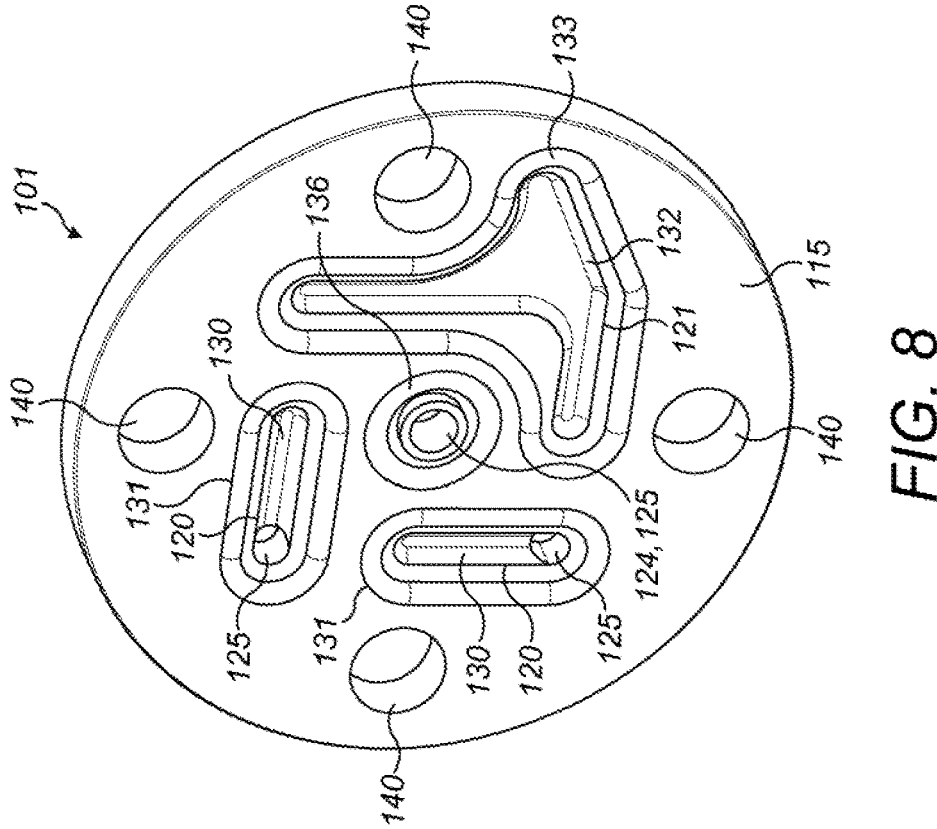
FIG. 8 is a perspective view of an inner face of a first distribution plate of the fluid distribution assembly of FIG. 6.
Figure 10:
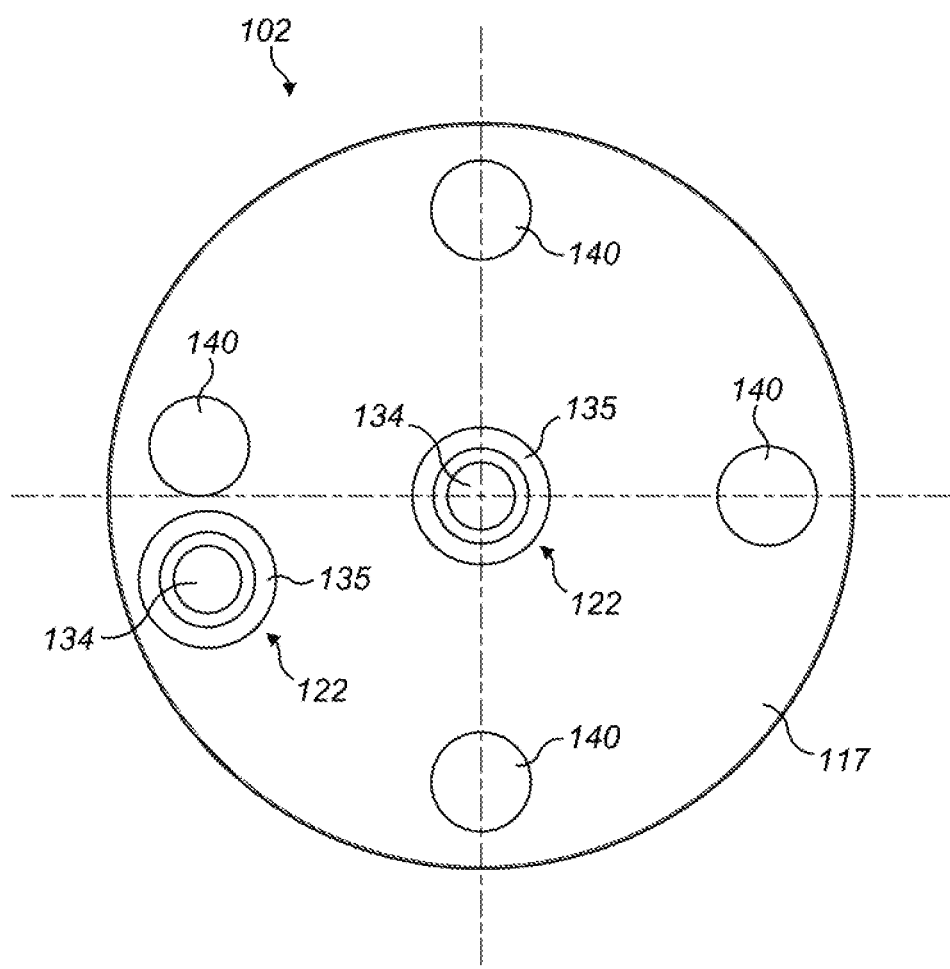
FIG. 10 is a perspective view of an inner face of a second distribution plate of the fluid distribution assembly of FIG. 6.

The at least one distribution plate 101, 102, in this case first and second distribution plates 101, 102 and illustrated in further detail in FIGS. 8 to 10, comprises at least one distribution arrangement 120, 121, 122, 124 for controlling the communication of fluid to and/or from the at least one device inlet 104 and/or outlet 105. In particular, the distribution arrangement 120, 121, 122, 124 may combine (i.e. converge), redirect and/or block (i.e. check) fluid flow. The at least one distribution plate 101, 102 is located adjacent to and may abut and/or be mounted to a first and/or second device end 106, 107. The first distribution plate 101 may be located adjacent to, abut and/or be mounted to the first device end 106 and the second distribution plate 102 may be located adjacent to, abut and/or be mounted to the second device end 107. The first distribution plate 101 may be mounted between the pin 27 and first device end 106 and the second distribution plate 102 may be mounted between the mounting component 84 and the second device end 107. The at least one distribution plate 101, 102 may comprise an inner face 115, 117 adjacent the first or second device end 106, 107 and an outer face 116, 118 opposing the pin 27 or mounting component 84. The at least one distribution plate 101, 102 may comprise a substantially disc, which may be circular, as illustrated and may be between approximately 2 mm and approximately 20 mm thick, optionally approximately 5 mm thick. The at least one distribution plate 101, 102 comprises at least one plate passageway 125 extending therethrough, such as between the inner and outer faces 115, 116, 117, 118. The or each distribution plate 101, 102 may comprise fewer plate passageway(s) 125 than device inlet(s) 104 and/or outlet(s) 105 at the first or second device end 106, 107 adjacent to the or each distribution plate 101, 102.

The at least one distribution arrangement 120 may comprise at least one combination arrangement 120 configured to combine fluid from a plurality of device outlets 105 and direct the combined fluid through the at least one plate passageway 125. The at least one combination arrangement 120 may comprise a combination recess 130 in the distribution plate 101, 102 inner face 115, 117. The combination recess 130 may extend over a plurality of device outlets 105 and the at least one plate passageway 125 may extend through the combination recess 130. In the embodiment of FIGS. 6 to 10 the first distribution plate 101 comprises two combination arrangements 120, the combination recess 130 of each extending over two device outlets 105 and leading into a plate passageway 125. Thus each combination arrangement 120 is arranged to combine fluid flow from two device outlets 105 and direct it out of a single plate passageway 125. The at least one combination arrangement 120 may comprise at least one combination seal 131, which may be elastomeric and may be an O-ring or sealant, arranged around the combination recess 130 and around the plurality of device outlets 105 to form a seal therebetween. The at least one combination arrangement 120 may not comprise a combination recess 130 and may instead only comprise at least one combination seal 131, for example if the combination seal 131 is sufficiently large to form a seal cavity between the distribution plate 101, 103 and distribution device 100 through which fluid can be communicated. At least one fewer plate passageway 125 may extend through the combination recess 130 than the number of device outlets 105 over which the combination recess 130 extends.

The at least one distribution arrangement 121 may comprise at least one redirection arrangement 121 configured to redirect fluid from at least one device outlet 105 to at least one device inlet 104. The at least one redirection arrangement 121 may comprise a redirection recess 132 in the distribution plate 101, 102 inner face 115, 117. The redirection recess 132 may extend over at least one device outlet 105 and inlet 104 for redirecting fluid therebetween. In the embodiment of FIGS. 6 to 10 the first distribution plate 101 comprises a redirection arrangement 121 having a redirection recess 132 extending over and arranged to receive fluid from four device outlets 105. The redirection arrangement 121 extends over the device inlet 104 located off-centre and adjacent to the periphery of the first device end 106. Thus the redirection arrangement 121 is arranged to receive fluid from the four device outlets 105 and redirect the fluid back into the distribution device 100 through the device inlet 104.

The at least one redirection arrangement 121 may comprise a redirection seal 133, which may be elastomeric and may be an O-ring or sealant, arranged around the redirection recess 132 and around the at least one device inlet 104 and outlet 105 to form a seal therebetween. The at least one redirection arrangement 121 may not comprise a redirection recess 132 and may instead only comprise the redirection seal 133, for example if the redirection seal 133 is sufficiently large to form a seal cavity between the distribution plate 101, 103 and distribution device 100 through which fluid can be communicated.

The at least one distribution arrangement 122 may comprise at least one blocking arrangement 122 configured to block fluid communicating through at least one device inlet and/or outlet 104, 105. The at least one blocking arrangement 122 may comprise a blocking wall or blocking recess 134 in the distribution plate 101, 102 inner face 115, 117 arranged to block fluid communicating through at least one device inlet and/or outlet 104, 105. The blocking wall may comprise a portion of the inner face 115, 117. In the embodiment of FIGS. 6 to 10 the second distribution plate 102 comprises two blocking arrangements 122, each comprising a blocking recess 134 extending over and preventing fluid communicating through the device inlets 104 at the second device end 107. The at least one blocking arrangement 122 may comprise a blocking seal 135, which may be elastomeric and may be an O-ring or sealant, arranged around the blocking wall or recess 134 and around the at least one device inlet and/or outlet 104, 105 to form a seal therebetween. Alternatively, the at least one blocking arrangement 122 may not comprise a blocking wall or blocking recess 134 and may only comprise a blocking seal 135, for example if the blocking seal 135 entirely covers and seals the at least one device inlet and/or outlet 104, 105

The at least one distribution arrangement 124 may comprise at least one direct fluid passageway 124 configured to direct fluid communicating through a device inlet or outlet 104, 105. The at least one direct fluid passageway 124 may be formed from at least one plate passageway 125 extending between the inner and outer faces 115, 116, 117, 118. In the embodiment of FIGS. 6 to 10 the first distribution plate 101 comprises a direct fluid passageway 124 leading to the centrally located device inlet 104 in the first end 106 for communicating fluid directly therethrough. The at least one direct fluid passageway 124 may comprise a direct seal 136, which may be elastomeric and may be an O-ring or sealant, arranged around at least one direct fluid passageway 124 and device inlet and/or outlet 104, 105 to form a seal therebetween.

The at least one distribution plate 101, 102 may comprise at least one outer seal 137, which may be elastomeric and may be an O-ring or sealant, arranged at the outer face 116, 118 and around any plate passageway 125 extending through the at least one distribution plate 101, 102.

The fluid distribution assembly 28 may be arranged to communicate fluid between the pin passageways 31, 36, 42 and the interface between the pin 27 and the at least one bearing housing 29, 30 and between the pin passageways 31, 36, 42 and the fluid delivery system 75. Thus the at least one plate passageway 125 of the at least one combination arrangement 120 and/or at least one direct fluid passageway 124 may be aligned with at least one pin passageway inlet and/or outlet 32, 38, 43. In particular, the at least one plate passageway 125 of the at least one combination arrangement 120 may be aligned with the first and third pin passageway inlets 32, 43 and that of the at least one direct fluid passageway 124 may be aligned with the second pin passageway outlet 38. The fluid distribution assembly 28 may be arranged to communicate fluid from the at least one device side outlet 114 and through the side passageway 85 to another coupling assembly 13, 19, 24, 25, 26.

The distribution device 100 and at least one distribution plate 101, 102 may be mounted to one another by at least one bolt (not illustrated) that passes through at least one plate bore 140 of the at least one distribution plate 101, 102 and through at least one device bore 141 of the first and/or second device end 106, 107. As illustrated in FIG. 10, the plate and device bores 140, 141 may be located around a circle in a rotationally asymmetric arrangement around the centre of the at least one distribution plate 101, 102 or first or second device end 106, 107. In particular, the arc length between at least three pairs of plate and device bores 140, 141 may be the same as illustrated. The arc length between at least one pair of plate and device bores 140, 141 and its adjacent pairs of pair of plate and device bores 140, 141 may be different as illustrated. This arrangement helps to provide guidance to the person mounting the at least one distribution plate 101, 102 to the distribution device 100 such that they cannot mount it out of line.

During operation of the machine 10, fluid may be pumped by the at least one pump from the reservoir of the fluid delivery system 75 to at least one flexible hose. The at least one flexible hose may be mounted to a port over the first fluid system passageway 71. The first fluid system passageway 71 may direct the fluid into the at least one external groove 60, which may direct the fluid through the at least one housing input passageway 52 into the first internal seal 51. The first internal seal 51 may direct the fluid into the second pin passageway inlet 37 and the second pin passageway 36 may direct the fluid to the second pin passageway outlet 38. Fluid is then directed through the at least one direct fluid passageway 124 of the first distribution plate 101 to the device inlet 104 at the first device end 106.

The distribution device 100 may then split the flow of fluid and meter predetermined quantities of the fluid at a substantially continuous and equally divided flowrate out of each of the device outlets 105. In particular, fluid passes into the distribution device 100, and may be sequentially directed to each device outlet 105 by the position of the one or more spools. The change in position of the one or more spools may result from the backpressure caused by the fluid entering the distribution device 100. The at least one check valve may allow fluid to exit the device outlets 105 and may prevent fluid from re-entering the distribution device 100.

Fluid is then be sequentially directed from the device outlets 105 through the combination arrangements 120 to the first and/or third pin passageway inlet 32, 43 to the first and/or third pin passageway inlet 32. Fluid is then be directed from the first and/or third pin passageway inlet 32, 43 through the first and/or third pin passageway 31, 42 to the first and/or third pin passageway outlet 33, 44. The fluid may then pass into the internal grooves 58 of the one or more bearing housings 29, 30 and spread across the interface between the pin 27 and bearing housing 29 for lubrication.

In addition, fluid may be directed from the device outlets 105 into the at least one redirection arrangement 121 and subsequently back into at least one device inlet 104. The distribution device 100 may be arranged to communicate fluid from the at least one device side outlet 114 and through the side passageway 85 to another coupling assembly 13, 19, 24, 25, 26, optionally under the control of at least one spool in the distribution device 100. Furthermore, in the illustrated embodiment the distribution device 100 may be configured to communicate fluid through the device inlets 104 in the second device end 107, but the blocking arrangements 122 may prevent such communication.

In the above description reference has been made to first, second and third pin passageways 31, 36, 42. However, the coupling assembly 23, 24 may comprise any number of pin passageways 31, 36, 42. In addition, the fluid distribution assembly 28 may only comprise one distribution plate 101, 102 depending upon the configuration of the distribution device 100 (e.g. if a first or second device end 106, 107 does not comprise device inlets or outlets 104, 105).

INDUSTRIAL APPLICABILITY

By delivering fluid through the first and/or third pin passageway 31, 42, the fluid may enter the interface between the pin 27 and one or more bearing housings 29, 30. As a result, external hoses and the like may not be required to deliver fluid directly to the area of the interface where it is required. Instead, the fluid delivery system 75 may deliver fluid to the fluid distribution assembly 28 (e.g. through the pin 27). The fluid distribution assembly 28 may not require external input or control, and may operate passively. Therefore, if a sufficient amount of fluid and a sufficient pressure is provided, the fluid distribution assembly 28 may sequentially distribute one or more predetermined quantities of fluid to the respective one or more passageway outlets 33, 44. This may simplify the system and may ensure it is more robust.

The implementation of the housing input passageway 52 may result in the reduction of vulnerable external lines as the housing input passageway 52 may enable the communication of fluid entirely internally within the components of the machine 10 from a single port on the outside of the component to the second pin passageway 36 via the first fluid system passageway 71.

The pin 27, fluid distribution assembly 28 and one or more bearing housings 29 may be configured to direct fluid received at the fluid distribution assembly 28 back to the fluid delivery system 75 for onward communication to further coupling assemblies 13, 19, 23, 24, 25, 26. In particular, the fluid distribution assembly 28 may communicate fluid from the at least one device side outlet 114 and through the side passageway 85 to another coupling assembly 13, 19, 24, 25, 26. This may allow the fluid delivery system 75 to deliver fluid to a number of other coupling assemblies 13, 19, 24, 25, 26 arranged in series or in parallel. Thus a single flexible hose mounted to a single port on the outside of the component delivering fluid to the second pin passageway 36 can be used to feed fluid to a plurality of coupling assemblies 13, 19, 23, 24, 25, 26. This may significantly reduce the number of flexible hoses and other such lines of the fluid delivery system 75, thus reducing the likelihood of them being struck by debris or the like whilst undertaking work.

By mounting the fluid distribution assembly 28 to the pin 27, only a single input system may be required to direct fluid to the pin 27, such as via the at least one housing input passageway 52 and second pin passageway 36. By the fluid distribution assembly 28 having multiple device outlets 105 and fewer device inlets 104 than device outlets 105, fewer flexible hoses and the like may be required to deliver fluid to multiple points at the interface between the pin 27 and the one or more bearing housings 29, 30.

By virtue of the fluid distribution assembly 28 comprising at least one distribution plate 101, 102, it is possible to vary the design of the fluid distribution assembly 28 to different coupling assemblies 13, 19, 23, 24, 25, 26 with different lubrication requirements without changing the distribution device 100. Thus the at least one distribution plate 101, 102 may be designed as an adapter for the distribution device 100 to operate in different coupling assemblies 13, 19, 23, 24, 25, 26. This is particularly beneficial if the distribution device 100 ejects a constant and same flowrate of fluid from each device outlet 105. By virtue of the at least one combination arrangement 120 the at least one distribution plate 101, 102 may allow fluid to exit from a single plate passageway 125 from a single device outlet 105, some device outlets 105 or all of the device outlets 105. Thus the flowrate at that single plate passageway 125 can be configured depending upon the lubrication requirements of the pin 27. The at least one blocking arrangement 122 enables the blocking of device inlets and/or outlets 104, 105 that are not required in a certain coupling assembly 13, 19, 23, 24, 25, 26. The at least one redirection arrangement 121 may allow for the control of flow back into the distribution device 100 wherever needed.

Figure 6:
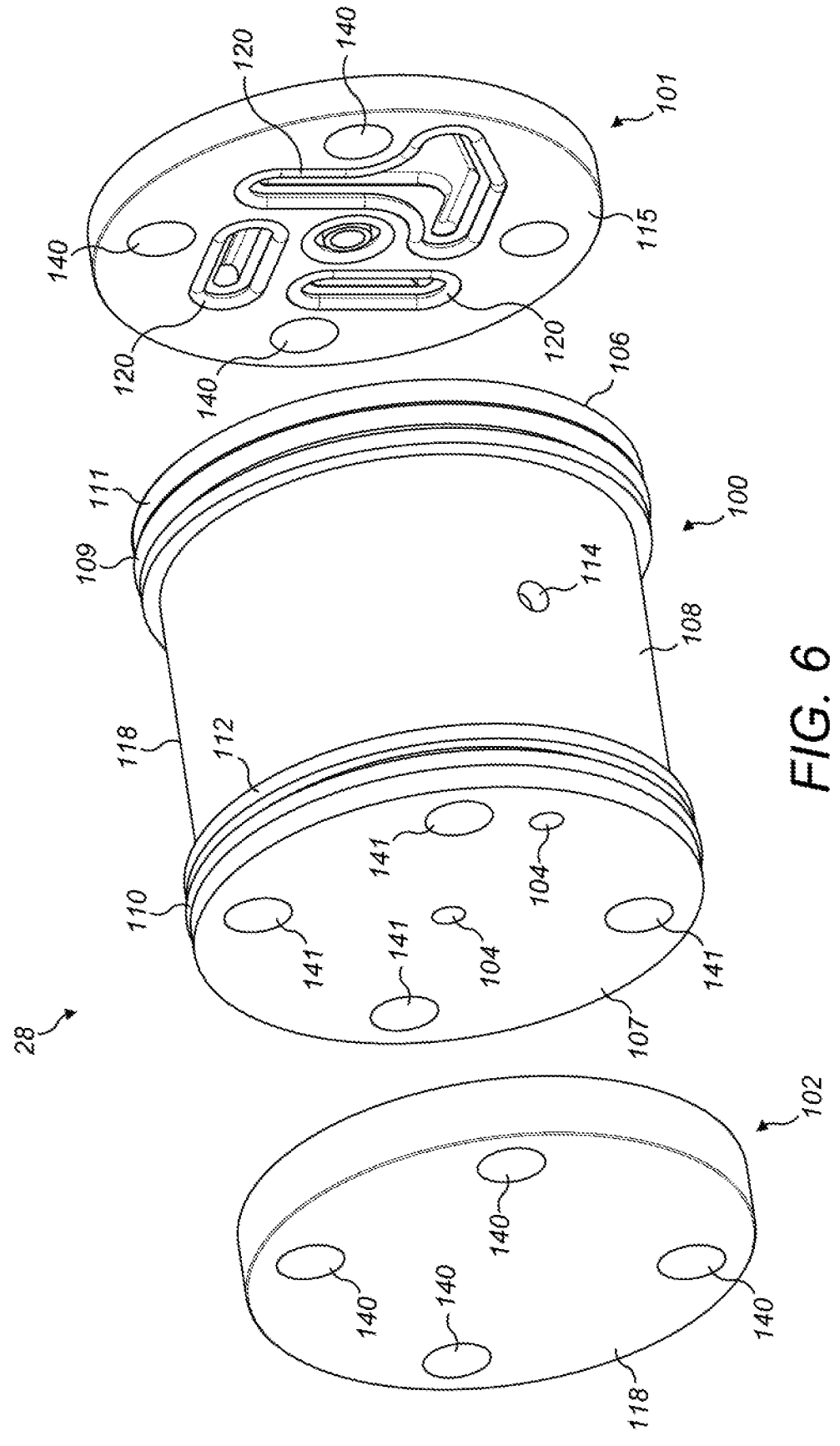
FIG. 6 is an exploded perspective view of a fluid distribution assembly of the present disclosure.
Figure 7:
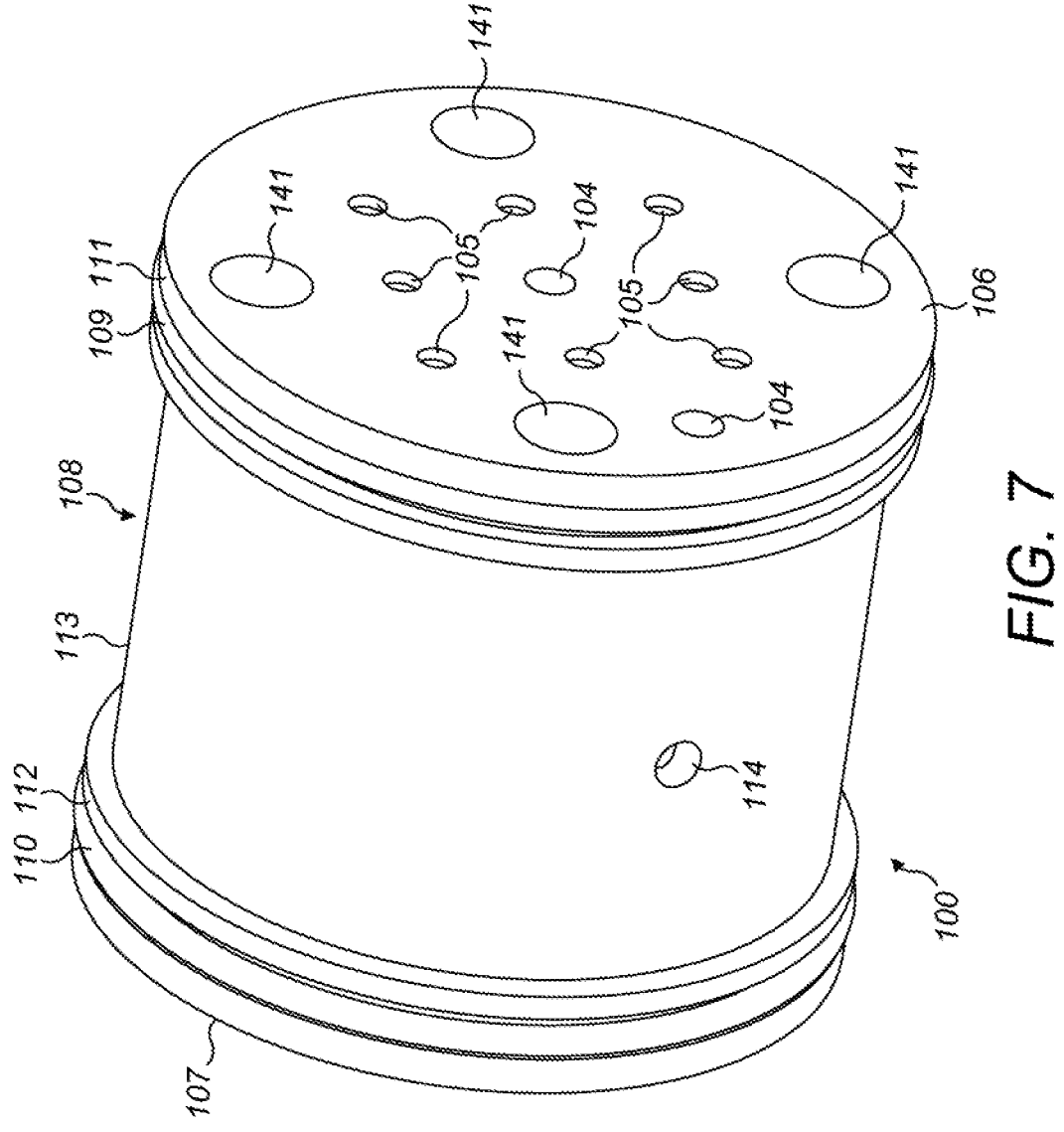
FIG. 7 is a perspective view of a first device end of a distribution device of the fluid distribution assembly of FIG. 6.
Figure 12:
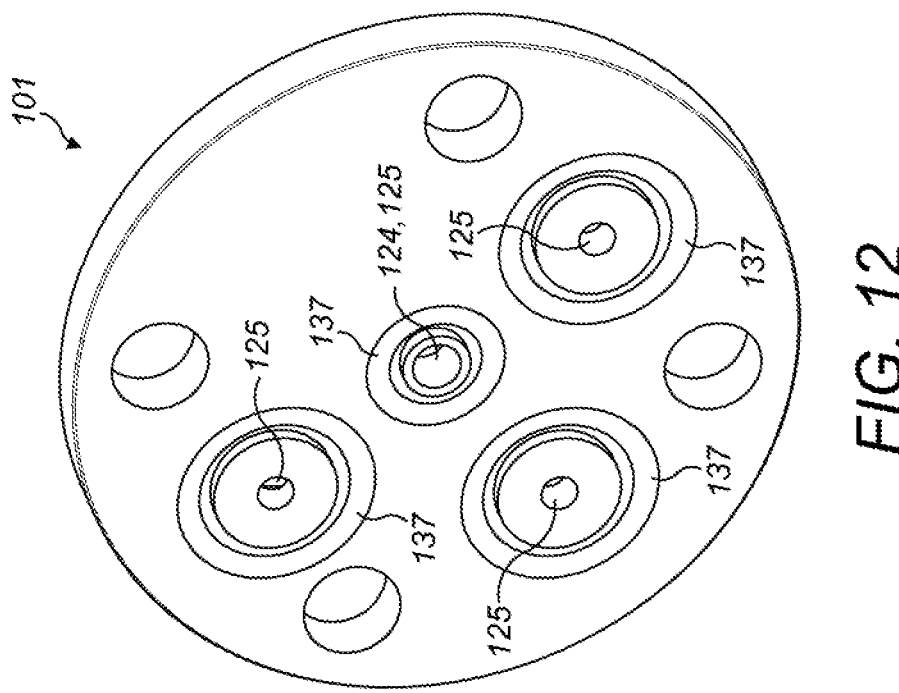
FIG. 12 is a perspective view of an outer face of the first distribution plate of FIG. 11.
Figure 11:
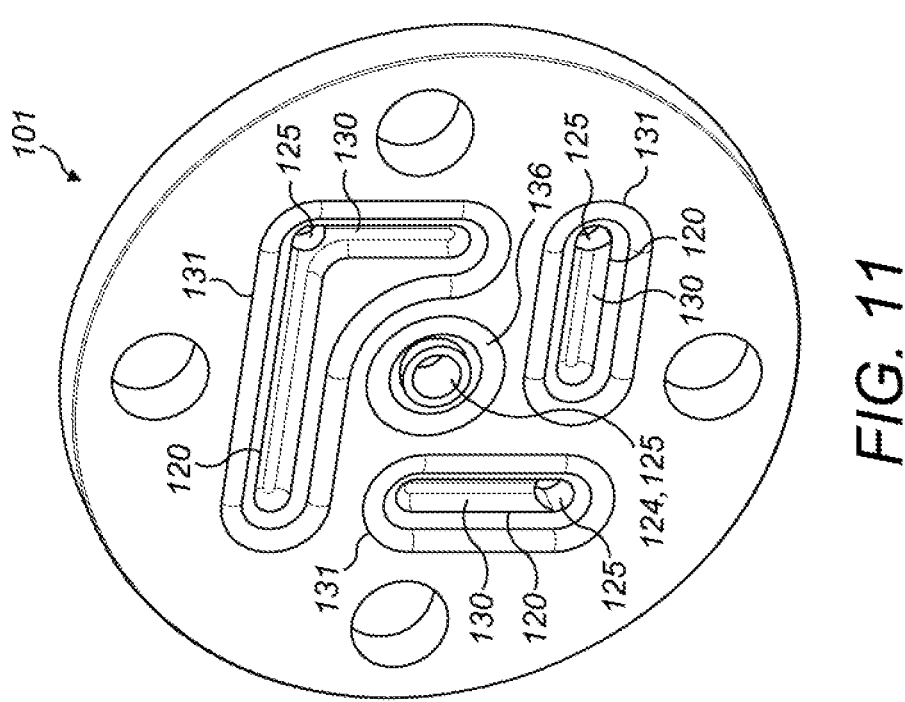
FIG. 11 is a perspective view of an inner face of a further embodiment of a first distribution plate for the fluid distribution assembly of the present disclosure.
Figure 14:
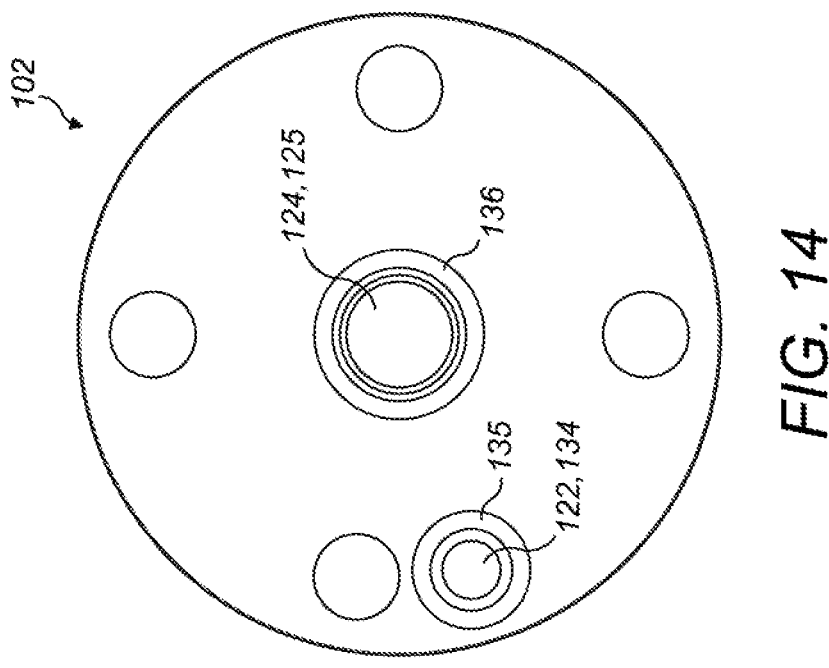
FIG. 14 is a plan view of an inner face of a further embodiment of a second distribution plate for the fluid distribution assembly of the present disclosure.
Figure 13:
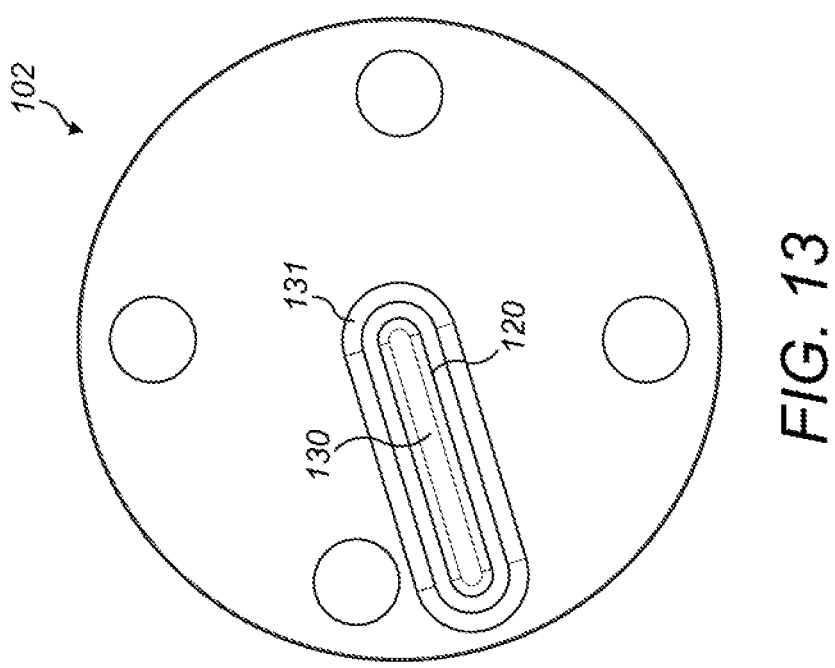
FIG. 13 is a plan view of an inner face of a further embodiment of a second distribution plate for the fluid distribution assembly of the present disclosure.

FIGS. 11 to 16 illustrate further embodiments of the at least one distribution plate 101, 102 and may be particularly suitable for use with the distribution device 100 shown in FIGS. 6 and 7. FIGS. 11 and 12 illustrate a first distribution plate 101 comprising three combination arrangements 120; two combining fluid output from two device outlets 105 and one combining fluid from four device outlets 105. FIG. 13 illustrates the inner face 117 of an embodiment of the second distribution plate 102 comprising a combination arrangement 120 for directing fluid between a device inlet 104 and a device outlet 105 and the second device end 107, such as to direct the fluid back into the distribution device 100 for directing out of the at least one device side outlet 114. FIG. 14 illustrates the inner face 117 of an embodiment of the second distribution plate 102 comprising a blocking arrangement 122 for one device inlet or outlet 104, 105 and at least one direct fluid passageway 124 for another device inlet or outlet 104, 105. The at least one direct fluid passageway 124 may be threaded or the like and at least one hose of the fluid delivery system 75 may be connected thereto such that fluid can be directed straight into the distribution device 100 rather than through the pin 27.

Figure 16:
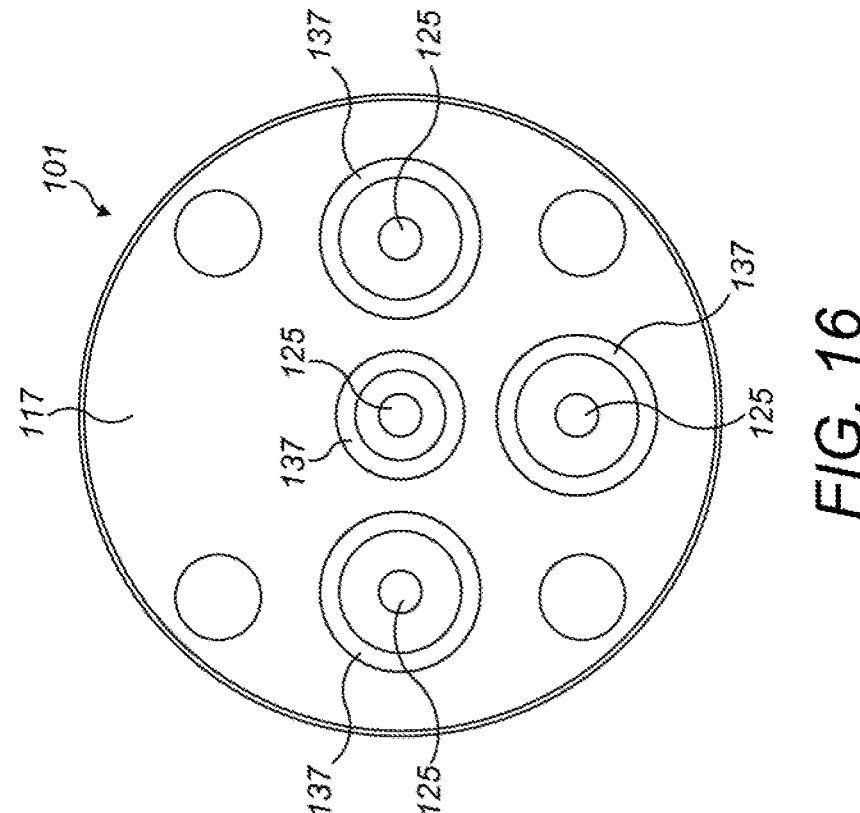
FIG. 16 is a plan view of an outer face of the first distribution plate of FIG. 15.
Figure 15:
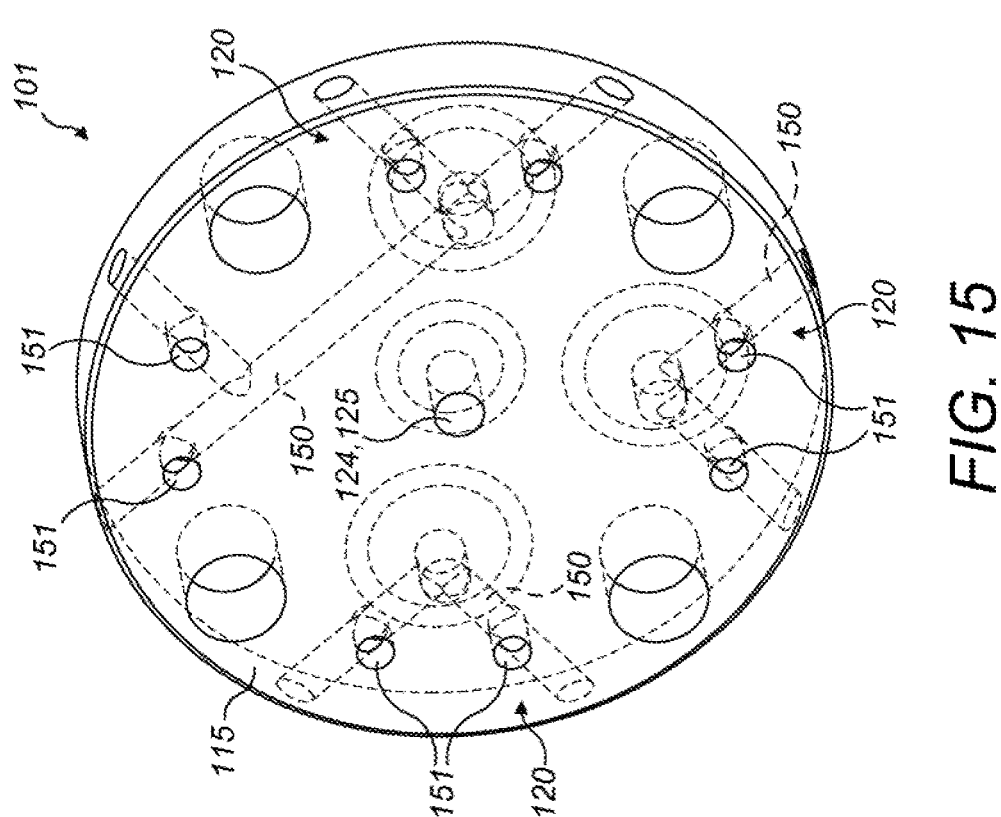
FIG. 15 is a transparent perspective view of a further embodiment of a first distribution plate for the fluid distribution assembly of the present disclosure showing combination bores with the first distribution plate.

FIGS. 15 and 16 illustrates a further embodiment of the at least one combination arrangement 120. In particular, the at least one combination arrangement 120 may comprise a combination bore 150 extending from combination bore inlets 151 at the inner face 115, 117, through the distribution plate 101, 102 and to the at least one plate passageway 125. The combination bore 150 is illustrated as being open at the circumference of the first distribution plate 101 in FIGS. 15, which assists with their manufacture. However, the combination bore 150 may be entirely enclosed and/or sealed within the distribution plate 101, 102, for example by a plug or other seal being located at the illustrated openings, such that fluid cannot exit at the circumference. The at least one plate passageway 125 may extend to and be located at the outer face 116, 118. Each combination bore inlet 151 may be aligned with a device outlet 105. Thus fluid may exit each device outlet 105, enter each combination bore inlet 151, be combined with fluid from at least one other combination bore inlet 151 in the combination bore 150 and exit the distribution plate 101, 102 via the at least one plate passageway 125. Fluid may flow in the opposite direction if at least one device inlet 104 is aligned with at least one combination bore inlet 151. The at least one plate passageway 125 may be aligned with at least one pin passageway inlet and/or outlet 32, 38, 43 and thus communicate fluid through the pin passageways 31, 36, 42.

In FIGS. 15 and 16 the first distribution plate 101 comprises three combination arrangements 120: two combining fluid output from two device outlets 105 and one combining fluid from four device outlets 105. The first distribution plate 101 further comprises a direct fluid passageway 124. Each combination arrangement 120 may combine fluid from at least two, up to all of the, device outlets 105 and direct the fluid out of at least one, or at least two, plate passageways 125. In addition, although not illustrated, the at least one redirection arrangement 121 may comprise a similar arrangement to the combination arrangements 120 if FIGS. 15 and 16 and thus may comprise a redirection bore extending from at least one redirection bore inlet aligned with at least one device outlet 105. The redirection bore may extend through the distribution plate 101, 102 and may extend to at least one redirection bore outlet aligned with at least one device inlet 105. Thus the fluid may be redirected by being communicated from the at least one device outlet 105, through the at least one redirection bore inlet, through the redirection bore, through the at least one redirection bore outlet and back into the distribution device 100 via the at least one device inlet 105.

Figure 17:
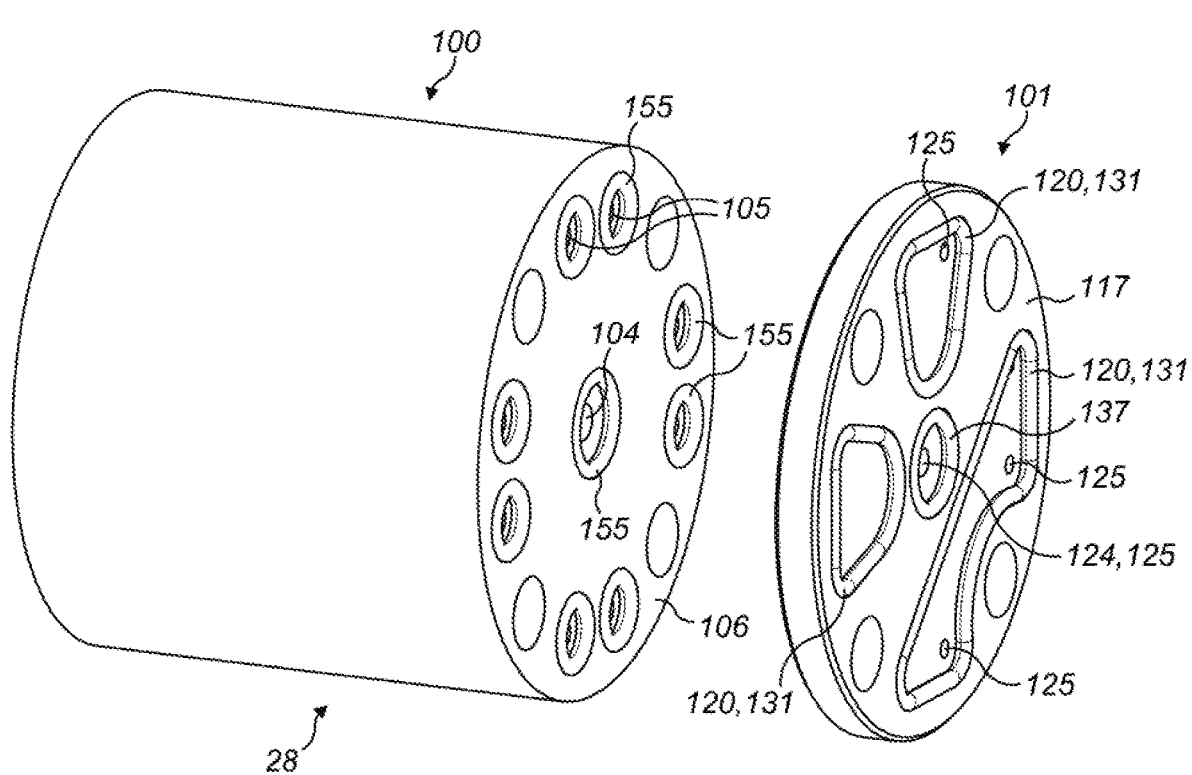
FIG. 17 is an exploded perspective view of a further embodiment of a fluid distribution assembly of the present disclosure.
Figure 18:
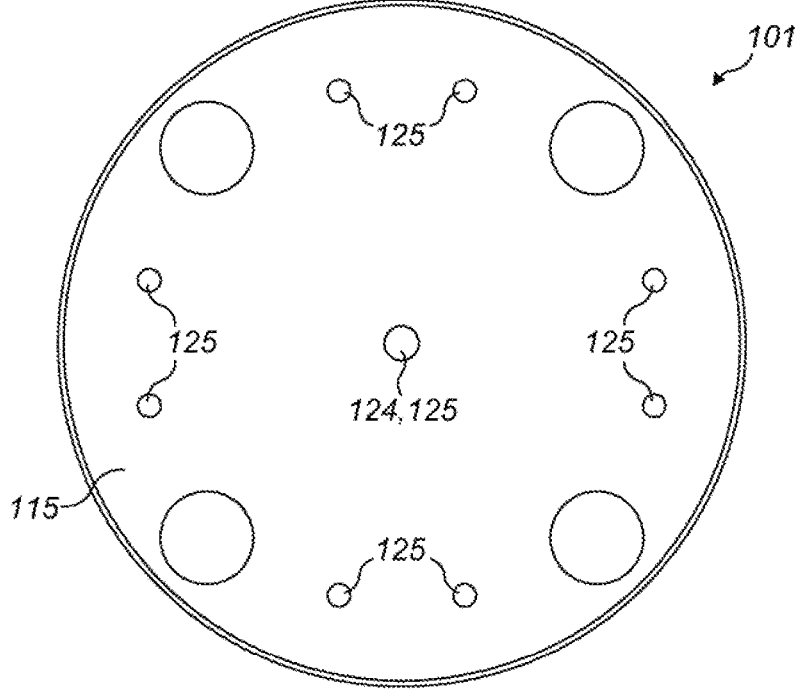
FIG. 18 is a plan view of an inner face of a first distribution plate of the fluid distribution assembly of FIG. 17.

FIGS. 17 to 18 illustrate further embodiments of the distribution device 100, at least one distribution plate 101, 102 and at least one combination arrangement 120. In particular, combination of fluid flows occurs on the outer face 116, 118 rather than at the inner face 115, 117 or within the distribution plate 101, 102. Thus the at least one combination arrangement 120 may comprise a combination recess 130 in, and/or combination seal 131 at, an outer face 116, 118. The distribution plate 101, 102 may comprise a plurality of plate passageway 125 extending therethrough. Each plate passageway 125 may extend from an inner face 115, 117 to the outer face 116, 118. Each plate passageway 125 may be aligned with a device outlet 105 at the inner face 115, 117. The combination recess 130 extends over and/or the combination seal 131 extends around the plurality of plate passageways 125 at the outer face 116, 118. Each combination recess 130 extends over and/or combination seal 131 extends around at least one pin passageway inlet and/or outlet 32, 38, 43. Thus fluid may flow from each device outlet 105, through each plate passageway 125 and into a cavity formed between the distribution plate 101, 102 and pin 27 by the combination recess 130 and/or combination seal 131, from which the fluid enters at least one pin passageway inlet 32, 43. Fluid may flow in the opposite direction if at least one device inlet 104 is aligned with at least one plate passageway 125.

In FIGS. 17 to 18 the first distribution plate 101 comprises three combination arrangements 120: two combining fluid output from two device outlets 105 and plate passageways 125 and one combining fluid from four device outlets 105 and plate passageways 125. Each combination arrangement 120 comprises a combination recess 130 and a combination seal 131 extending around the edge of the combination recess 130. The first distribution plate 101 further comprises a direct fluid passageway 124. Each combination arrangement 120 may combine fluid from at least two, up to all of the, plate passageways 125. In addition, as illustrated, at least one intermediate seal 155 may be located around each device inlet and outlet 104, 105 between the distribution device 100 and at least one distribution plate 101, 102. The at least one intermediate seal 155 may be mounted to the distribution plate 100 as illustrated.

Although the aforementioned embodiments are particularly suitable when the fluid is a lubricant, the fluid distribution assembly 28 may also be implemented in any other system requiring the distribution of fluid using a distribution device 100 and where the use of the distribution plates 101, 102 can assist in controlling the communication of fluid to and/or from the at least one device inlet and/or outlet 104, 105. For example, the fluid distribution assembly 28 may be implemented for any type of lubricant or working fluid flow in hydraulic, pneumatic or fuel systems utilized in construction, aerospace and industrial applications or chemical processes.

The invention claimed is:

1. A fluid distribution assembly comprising:
a distribution device comprising at least one device inlet for receiving fluid and at least one device outlet for directing fluid out of the distribution device;
at least one distribution plate adjacent to the distribution device comprising at least one distribution arrangement for controlling the communication of fluid to and/or from the at least one device inlet and/or outlet; and
wherein the at least one distribution plate comprises at least one plate passageway and the at least one distribution arrangement comprises at least one combination arrangement configured to combine fluid from a plurality of device outlets and direct the combined fluid through the at least one plate passageway.

2. A fluid distribution assembly as claimed in claim 1 wherein the at least one combination arrangement comprises:
a combination recess in, and/or combination seal at, a distribution plate inner face, wherein the combination recess extends over and/or the combination seal extends around the plurality of device outlets and the at least one plate passageway extends from the combination recess and/or combination seal to a distribution plate outer face;
a combination bore extending from combination bore inlets at the distribution plate inner face, through the distribution plate and to the at least one plate passageway extending to the distribution plate outer face, each combination bore inlet being aligned with a device outlet; and/or
a combination recess in, and/or combination seal at, the distribution plate outer face, wherein the combination recess extends over and/or the combination seal extends around a plurality of plate passageways, wherein each plate passageway extends from the distribution plate inner face to the distribution plate outer face and is aligned with a device outlet at the distribution plate inner face.

3. A kit comprising:
a plurality of distribution devices and a plurality of distribution plates for a plurality of fluid distribution assemblies;
wherein the plurality of distribution devices are identical and at least two distribution plates of the plurality of distribution plates comprise different distribution arrangements;
wherein the distribution devices each include a plurality of bores extending through the distribution device, the plurality of bores defining at least one device inlet for receiving fluid and a plurality of device outlets for directing fluid out of the distribution device; and
wherein the distribution plates are each configured to be positioned adjacent to a distribution device of the distribution devices, wherein the distribution plates each include:

a first distribution arrangement configured to combine fluid flow from two or more of the plurality of device outlets of the distribution device; and/or
a second distribution arrangement configured to block fluid flow of a device inlet of the at least one device inlet of the distribution device and/or a device outlet of the plurality of device outlets of the distribution device.

4. A kit as claimed in claim 3 wherein at least one distribution plate of the distribution plates comprises at least one redirection arrangement configured to redirect fluid from at least one device outlet of the plurality of device outlets to one or more device inlets of the at least one device inlet.

5. A kit as claimed in claim 4 wherein the at least one redirection arrangement comprises:
a redirection recess in and/or a redirection seal at a distribution plate inner face, wherein the redirection recess and/or redirection seal extends over the at least one device outlet and the one or more device inlets for redirecting fluid therebetween; and/or
a redirection bore extending from at least one redirection bore inlet aligned with at least one device outlet, through the distribution plate and to at least one redirection bore outlet aligned with the one or more device inlets.

6. A kit as claimed in claim 3 wherein the second distribution arrangement comprises a blocking wall, blocking recess and/or blocking seal arranged to block the fluid flow of the device inlet and/or the device outlet.

7. A kit as claimed in claim 3 wherein at least one of the distribution devices comprises:
first and second device ends at which the at least one device inlet and/or at least one device outlet of the plurality of device outlets are located;
at least one device side extending between the first and second device ends; and
at least one device side outlet for communicating fluid outside of the at least one distribution device.

8. A kit as claimed in claim 3 wherein at least one of the distribution devices is configured to control the distribution of fluid from the at least one device inlet to the plurality of device outlets.

9. A kit as claimed in claim 8 wherein the at least one distribution device is configured to distribute the same predetermined flowrate of fluid to each device outlet of the plurality of device outlets.

10. A coupling assembly for a machine comprising:
a pin comprising at least a first pin passageway for fluid extending between a first pin passageway inlet and a first pin passageway outlet for directing fluid outside of the pin;
a fluid distribution assembly comprising:
a distribution device comprising at least one device inlet for receiving fluid and at least one device outlet for directing fluid out of the distribution device;
at least one distribution plate adjacent to the distribution device comprising at least one distribution arrangement for controlling the communication of fluid to and/or from the at least one device inlet and/or outlet; and
the fluid distribution assembly mounted to the pin such that the first pin passageway inlet or outlet is configured to communicate fluid with the at least one device outlet or inlet respectively via the at least one distribution arrangement.

11. A coupling assembly as claimed in claim 10 wherein the fluid distribution assembly is integrated at least partially inside the pin or is positioned outside the pin.

12. A machine comprising at least one coupling assembly according to claim 10, at least one first component and at least one second component rotatable relative to one another about the pin and a fluid delivery system for delivering and/or receiving fluid from the at least one coupling assembly.

13. A method for distributing fluid to the coupling assembly of claim 10 comprising:

receiving fluid through the at least one device inlet;

directing the fluid through the at least one device outlet, through the at least one distribution arrangement and to the first pin passageway inlet, along the first pin passageway and to the first pin passageway outlet; and directing fluid outside of the pin via the first pin passageway outlet.

\* \* \* \* \*